United States Patent
Shiojima (10) Patent No.: US 6,307,353 B1
(45) Date of Patent: Oct. 23, 2001

(54) SECONDARY BATTERY APPARATUS

(75) Inventor: Nobuo Shiojima, Tokyo (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/731,725

(22) Filed: Dec. 8, 2000

(30) Foreign Application Priority Data

Dec. 10, 1999 (JP) .................................................. 11-351698

(51) Int. Cl.$^7$ ................................. H02S 7/00; H02S 7/04
(52) U.S. Cl. ........................................... 320/139; 320/162
(58) Field of Search ..................................... 320/139, 162

(56) References Cited

U.S. PATENT DOCUMENTS 3,969,665 * 7/1976 Rowas ................................. 320/144
5,808,447 * 9/1998 Hagino ................................. 320/139

* cited by examiner

Primary Examiner—Gregory J Toatley, Jr.
(74) Attorney, Agent, or Firm—Oblon, Spivak, McClelland, Maier & Neustadt, P.C.

(57) ABSTRACT

A secondary battery apparatus includes a secondary battery, a battery voltage detector, a temperature rising rate detector and a charge controller. The charge controller starts pulse charging of the secondary battery which is performed by turning on/off a switch element located in a charge path of the secondary battery at predetermined periods when a terminal voltage of the secondary battery exceeds a first set voltage during charging of the secondary battery, stops the pulse charging while maintaining the switch element in a conductive state after the time the terminal voltage, observed at a particular time within a switch element blocking period during the pulse charging, exceeds a second set voltage, and blocks the switch element to stop charging the secondary battery when the temperature rising rate detector detects the secondary battery having reached a fully charged state during the charging subsequent to the pulse charging. As a result, the secondary battery is reliably and efficiently charged to the fully charged state in a short time without being affected by fluctuations in a charge current or an ambient temperature.

5 Claims, 4 Drawing Sheets

SECONDARY BATTERY APPARATUS

BACKGROUND OF THE INVENTION

1. Field of the Invention

The present invention relates to a secondary battery apparatus having a secondary battery and a charge controller, and more particularly to a secondary battery apparatus which can reliably charge a secondary battery to a fully charged state for a short time in any environment in which a charge current and an ambient temperature may vary.

2. Background Art

Some electronic devices such as a notebook-size personal computer and so on contain a secondary battery apparatus. This type of secondary battery apparatus includes a secondary battery comprised of a lithium ion battery, a Ni—Cd battery, a Ni—MH battery or the like. The secondary battery functions as a driving power supply when an electronic device is used in an environment in which the electronic device cannot be connected to an external power supply, for example, a commercial power supply. When the battery voltage is reduced as the secondary battery is being used, the secondary battery is charged using a charge power supply (for example, a power supply unit of an electronic device connected to a commercial power supply). The charging of the secondary battery, however, is likely to degrade the battery performance and safety unless the charging is properly carried out.

Thus, the secondary battery apparatus comprises a charge control function for controlling the charging of the secondary battery such that the charging is properly carried out. For example, the charge control function controls the charging such that the secondary battery is charged with a constant current in an initial charge period in which the battery voltage is lower, and is charged with a constant voltage after a predetermined battery voltage has been reached. However, such a constant current/constant voltage charging technique causes a large amount of heat to be generated from a charge power supply, and requires a large charge power supply, thereby causing difficulties in responding to the need for a reduction in size and weight of electronic devices and suppression of the amount of generated heat.

Another charge control technique charges a secondary battery with a constant current while monitoring a battery temperature, taking advantage of the fact that the battery temperature rises as the secondary battery is being charged more. This charge control technique, however, may be affected by an ambient temperature to result in over charging or insufficient charging. In addition, the battery temperature rises due to the heat generated inside the secondary battery, resulting from the continuous charging with a constant current, possibly leading to degraded battery performance.

Also, when a charge power supply for use in charging a secondary battery of a secondary battery apparatus is utilized as a driving power supply for an electronic device, the operation of the electronic device (for example, a hard disk drive built in the electronic device) during a charging process may cause variations in load of the charge power supply to adversely affect the operation of the electronic device as well as the charging of the secondary battery. For example, when the charge power supply has a small size power supply capacity, the operation of the electronic device will become unstable. Also, the charge current may vary with the operation of the electronic device, and a contact resistance at a connector connecting the electronic device with the secondary battery apparatus may vary due to mechanical vibrations caused by the operation of the electronic device. Such variations in the charge current and contact resistance may result in insufficient charging of the secondary battery.

SUMMARY OF THE INVENTION

It is an object of the present invention to provide a secondary battery apparatus which is capable of reliably and efficiently charging a secondary battery to a fully charged state in a short time without being affected by variations in a charge current or an ambient temperature.

It is another object of the present invention to provide a secondary battery apparatus which is capable of suppressing the heat generated in a charge power supply for use in charging a secondary battery and of charging the secondary battery with a small size charge power supply.

A secondary battery apparatus according to the present invention comprises a secondary battery, a switch element provided in series in a charge path of the secondary battery, a voltage detector for detecting a terminal voltage of the secondary battery, a full charge detector for detecting the secondary battery having reached a fully charged state, and a charge controller for controlling charging of the secondary battery by conducting or blocking the switch element. The charge controller includes a pulse charging starting unit for starting a conducting/blocking operation of the switch element at predetermined periods to start pulse charging the secondary battery when the terminal voltage exceeds a first set voltage during the charging of the secondary battery, a pulse charging stopping unit for stopping the pulse charging while maintaining the switch element in a conductive state when the terminal voltage has reached a second set voltage during a switch element blocking period of the pulse charging, and a charging stopping unit for blocking the switch element to stop charging subsequent to the pulse charging when the full charge detector detects the fully charged state of the secondary battery during the charging subsequent to the pulse charging.

The secondary battery apparatus according to the present invention switches a charging mode from continuous charging to pulse charging when the terminal voltage (charge voltage) of the secondary battery, which increases as the charging of the secondary battery is advanced, has reached the first set voltage, and then switches the charging mode from the pulse charging to the continuous charging when the charge voltage has reached the second set voltage close to full charge, thereby carrying out the charging while the charge voltage is properly managed from the starting of the charging to the fully charged state. As a result, it is possible to prevent insufficient charging and over charging, and to prevent degraded battery performance and safety due to improper charging.

Also, when a power supply unit of an electronic device is utilized as a charge power supply, the electronic device, if operated during the charging, may cause fluctuations in the charge current or a change in the connecting state between the electronic device and the secondary battery apparatus. The present invention, however, properly manages the charge voltage in step with the advancement of the charging, so that proper charging is done even in such an environments and is less susceptible to the influence of ambient temperature.

Also, according to the present invention, while the secondary battery is being charged, the charging mode is switched from continuous charging to pulse charging or from pulse charging to continuous charging as the charge voltage increases, and in particular, the heat generated inside the secondary battery and the heat generated from the charge power supply are suppressed during the pulse charging. Thus, the secondary battery can be efficiently, safely and reliably charged to the fully charged state in a short time. Also, even when a small charge power supply is used, the secondary battery can be properly charged.

Preferably, the charge controller blocks the switch element when the terminal voltage of the secondary battery has reached an abnormally high third set voltage during the charging of the secondary battery. According to this preferred aspect, when the charge voltage abnormally increases, the charging of the secondary battery is prohibited, thereby protecting the secondary battery from an excessive charge voltage, thus making it possible to prevent degraded battery performance.

Preferably, the full charge detector comprises a temperature sensor for detecting a temperature of the secondary battery (battery temperature), and detects the secondary battery having reached the fully charged state when the battery temperature detected by the temperature sensor has reached the set temperature, or when an increase in the battery temperature (a battery temperature change) exceeds the set value, or when the rising rate of the battery temperature exceeds the set value.

Alternatively, the full charge detector detects the secondary battery having reached the fully charged state when the terminal voltage of the secondary battery detected by the voltage detector has reached the set voltage, or when a peak of a voltage change is detected, or when a predetermined voltage drop is detected after the peak of the voltage change has been detected.

According to the two preferred arrangements, it is possible to exactly detect the secondary battery having reached the fully charged state and to prevent both excessive charging and insufficient charging.

Preferably, the charge controller conducts the switch element when the terminal voltage of the secondary battery is equal to or below a predetermined voltage, or when a discharge state of the secondary battery is detected. According to this preferred arrangement, when the terminal voltage of the secondary battery reduces, for example, to a predetermined voltage indicative of a discharge state of the secondary battery after the charging of the secondary battery has been once completed or when the secondary battery has been used as a power supply for driving an electronic device, the charging of the secondary battery can be resumed if the secondary battery apparatus is connected to an external power supply. Also, when the switch element is comprised of a field effect transistor, the switch element can be prevented from a failure resulting from the heat generated by a discharge current.

Preferably, the secondary battery is a set battery comprised of a plurality of connected battery cells. The voltage measuring unit detects a maximum value of battery voltages of the respective battery cells, and the charge controller controls the charging of the secondary battery in accordance with the maximum battery voltage value. According to this preferred arrangement, even if the plurality of battery cells constituting the secondary battery vary in charging characteristics from one another, a particular battery cell can be prevented from being excessively charged.

In the present invention, when a charge power supply for use in charging the secondary battery is commonly used as a power supply for driving a load such as an electronic device, the charge controller preferably blocks the switch element while the load is being driven by the charge power supply. More preferably, when the charge current of the secondary battery rises to a predetermined value or more during the load is being driven by the charge power supply, the switch element is blocked. According to this preferred arrangement, even if the capacity of the charge power supply is limited, fluctuations in the load of the charge power supply associated with the charging of the secondary battery can be prevented to supply the load with stable power. The secondary battery may be charged during a pause period in which the load is inoperative.

DETAILED DESCRIPTION

A secondary battery apparatus according to a first embodiment of the present invention will hereinafter be described with reference to the drawings.

Figure 1:
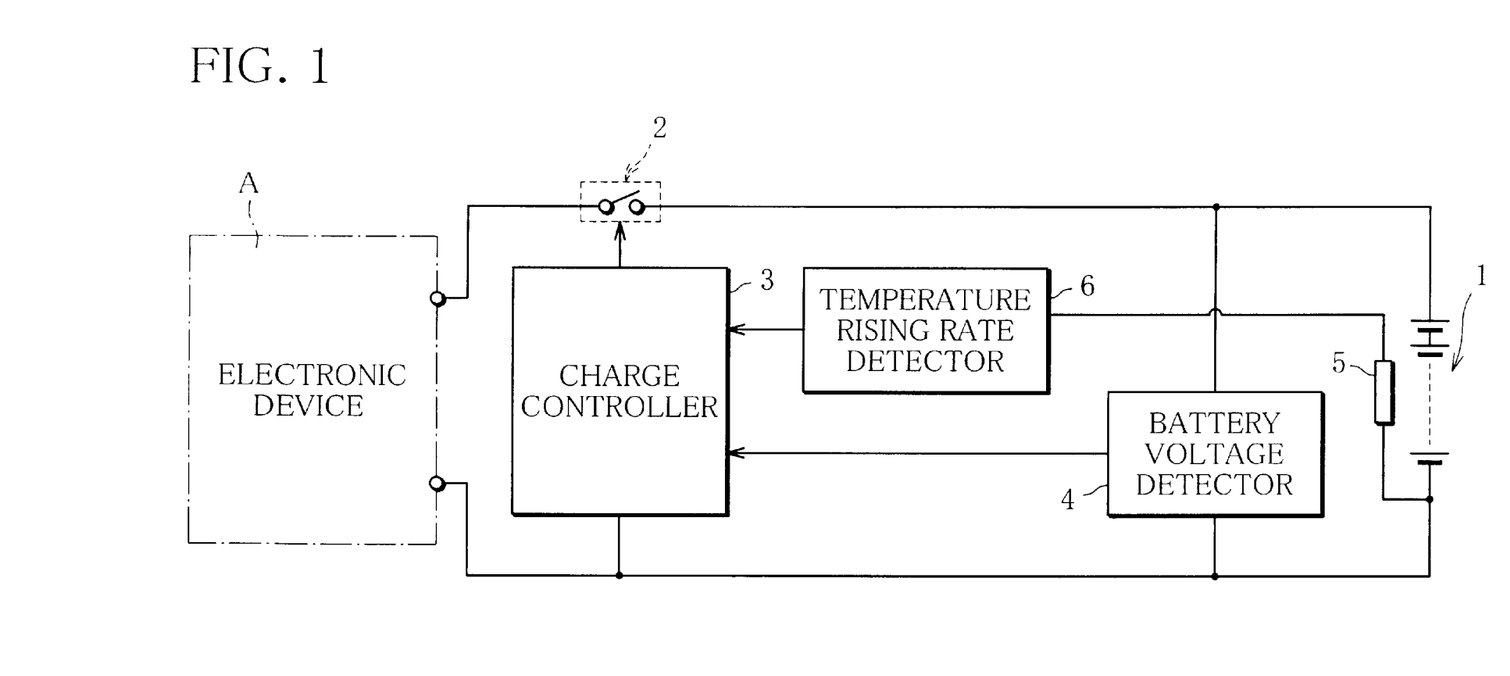
FIG. 1 is a schematic diagram illustrating a secondary battery apparatus according to a first embodiment of the present invention.

As illustrated in FIG. 1, the secondary battery apparatus according to the first embodiment is adapted for mounting onto an electronic device A such as a notebook-size personal computer and a portable telephone. Also, the secondary battery apparatus comprises a secondary battery 1 for use as a driving power supply for the electronic device A and comprised, for example, of Ni—MH battery cells, and is implemented in the form of a battery pack which comprises components 2 to 6, later described in detail, integrated with the secondary battery 1.

The secondary battery 1 in the first embodiment is configured as a set battery comprised of a plurality of battery cells connected in series, in parallel or in series and parallel with one another, such that it has a battery voltage and a battery capacity adapted for the specifications of the electronic device A. It should be noted that the secondary battery 1 may be comprised of a single cell. For charging the secondary battery 1, an external power supply, for example, a power supply unit of the electronic device A connected to a commercial power supply, may be utilized as a charge power supply.

A switch element 2, for example, comprised of a field effect transistor (FET) is provided in series in a charge/discharge circuit of the secondary battery 1. While in this embodiment, the switch element 2 is located on the positive pole side of the charge/discharge path, the switch element 2 may be located in the charge/discharge path on the negative pole side of the secondary battery 1.

A battery voltage detector 4 is also provided between positive and negative electrode terminals of the secondary battery 1 for detecting a terminal voltage Vb of the secondary battery 1. In this embodiment, the battery voltage detector 4 detects a voltage across both terminals of the secondary battery. Alternatively, the battery voltage detector 4 may be configured to detect a terminal voltage of each of the battery cells forming the secondary battery 1 together with the terminal voltage Vb or instead of the terminal voltage Vb.

A temperature sensor 5 is also provided near the secondary battery 1, for example, adhered on an armor of the secondary battery 1 for detecting a battery temperature Tb of the secondary battery 1. The temperature sensor 5 is comprised of a temperature sensitive element, for example, a thermistor which exhibits a resistance value varying in response to the temperature, and is connected to a temperature rising rate detector 6.

The temperature rising rate detector 6 receives a temperature sensor output indicative of the battery temperature Tb, and calculates an increase in the battery temperature Tb per unit time, i.e., the rising rate (dTb/dt) of the battery temperature Tb to detect the secondary battery 1 having reached a fully charged state when the rising rate of the battery temperature has reached the set value. To describe specifically, the temperature rising rate detector 6 constitutes a full charge detector for detecting the fully charged state in accordance with a dT/dt method.

Instead of the dT/dt method, the temperature rising rate detector 6 may use a TCO method for detecting a fully charged state when the battery temperature Tb has reached the predetermined set temperature, or a ΔT method for detecting the fully charged state when an increase in the battery temperature Tb, that is, a temperature change ΔT from a battery temperature in a steady state (for example, a battery temperature at the beginning of charging) exceeds the preset temperature difference.

Further alternatively, taking advantage of the fact that the battery voltage of the secondary battery 1 takes a peak value when the secondary battery 1 is close to the fully charged state, the achievement of the fully charged state in the secondary battery 1 may be detected when the battery voltage Vb has reached a predetermined voltage, or when a change in the battery voltage Vb has reached its peak, or when the battery voltage Vb is reduced by a predetermined voltage after a change in the battery voltage Vb has reached the peak.

The following description will be made on a main portion of the secondary battery apparatus which comprises the foregoing basic functions.

The secondary battery apparatus comprises, as a main component, a charge controller 3 for controlling the charging of the secondary battery 1 by conducting (on) or blocking (off) a switch element 2. The charge controller 3 has a function of maintaining the switch element 2 in a conductive state to charge the secondary battery with a constant current until the terminal voltage Vb of the secondary battery 1, detected by the battery voltage detector 4, reaches a first set voltage VI after the charging has been started, and a function of starting pulse charging when the terminal voltage Vb has reached the first set voltage V1 with the advancement of the constant current charging. Stated another way, the charge controller 3 constitutes a pulse charging starting unit. The first set voltage V1 is previously set at a terminal voltage, at which the pulse charging should be started, determined in accordance with the type of the secondary battery 1. The pulse charging is performed by conducting and blocking the switch element 2 at predetermined intervals. In the following description, a period in which the switch element 2 is blocked is called the "switch element blocked period."

The charge controller 3 comprises a function of conducting the switch element 2 to stop the pulse charging when the terminal voltage of the secondary battery 1, observed in the switch element blocked period of the pulse charging, has reached a second set voltage V2, and therefore constitutes a pulse charging stopping unit. In this embodiment, for detecting the terminal voltage in the switch element blocking period, a terminal voltage (open voltage OV) is detected, which voltage is observed when a predetermined time is elapsed from the time the switch element 2 is blocked during the pulse charging to enter the switch element blocked period. For example, a terminal voltage observed immediately before the switch element 2 is switched from the blocked state to the conductive state is detected. The second set voltage V2 is previously set at a voltage which indicates that the secondary battery 1 is close to the fully charged state (a terminal voltage, at which the pulse charging should be stopped, determined in accordance with the type of the secondary battery 1). Then, the switch element 2 is maintained in the conductive state after the terminal voltage has reached the set voltage V2. As a result, the pulse charging is stopped when the terminal voltage has reached the set voltage V2, followed by a constant current charging which is performed subsequent to the pulse charging.

The charge controller 3 further has a function of blocking the switch element 2 to stop charging the secondary battery 1 when the temperature rising rate detector 6 detects that the constant current charging is advanced subsequent to the pulse charging to allow the secondary battery 1 to reach its fully charged state. Stated another way, the charge controller 3 constitutes a charging stopping unit.

Figure 2:
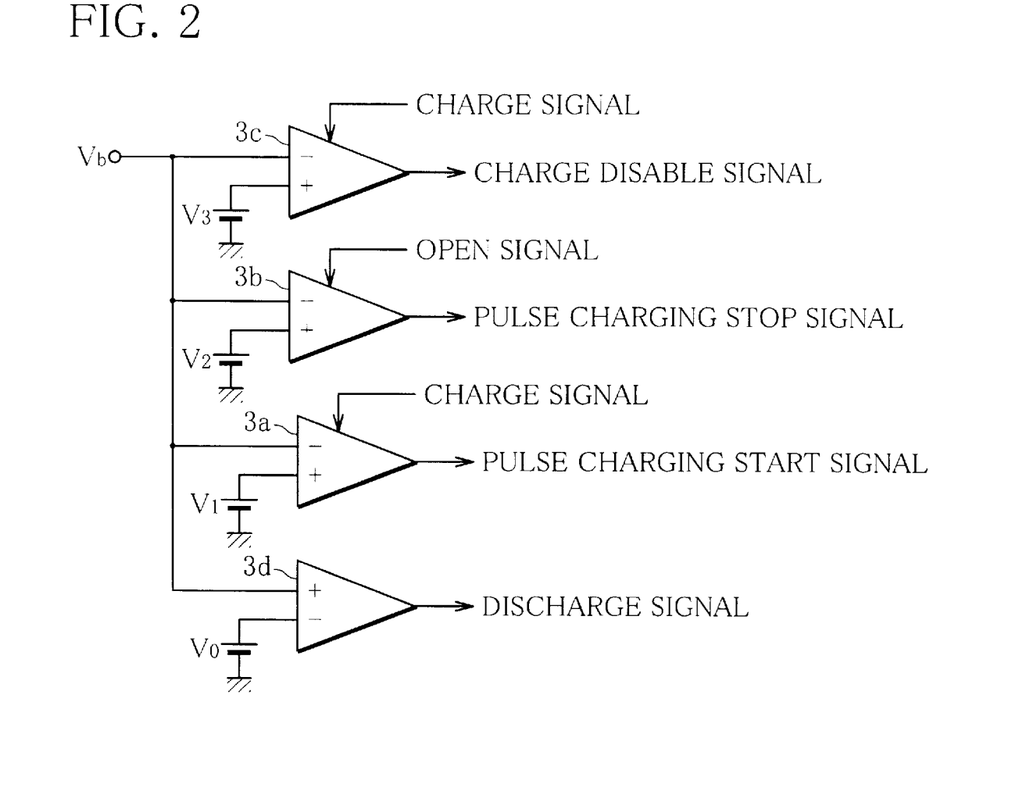
FIG. 2 is a diagram illustrating a battery voltage monitoring function in a charge controller.

For implementing the functions of the pulse charging starting unit and the pulse charging stopping unit, the charge controller 3 comprises first and second comparators 3a, 3b as illustrated in FIG. 2. The charge controller 3 also comprises third and fourth comparators 3c, 3d for implementing a function of forcedly stopping the charging when the secondary voltage 1 is applied with an excessively large charging voltage and a function of enabling the charging to be resumed when the terminal voltage of the secondary battery 1 is reduced.

The first and third comparators 3a, 3c compare the terminal voltage Vb of the secondary battery 1 with the first and third set voltages V1, V3 during the charging of the secondary battery 1, respectively. Both the comparators 3a, 3b are supplied with a charge signal indicating that the secondary battery 1 is being charged. This charge signal is supplied from the charge controller 3 to both the comparators 3a, 3c, for example, while the electronic device A is connected to a commercial power supply.

The first comparator 3a determines whether or not the terminal voltage Vb exceeds the first set voltage V1 during the charging, and outputs a pulse charging start signal when the terminal voltage Vb exceeds the first set voltage V1. The charge controller 3 starts the pulse charging in response to the output of the pulse charging start signal.

The third comparator 3c in turn determines whether or not the terminal voltage Vb exceeds the third set voltage V3 during the charging, and outputs a charge disable signal when the terminal voltage Vb exceeds the third set voltage V3 corresponding to an excessive charge voltage. Therefore, when the terminal voltage Vb has unintentionally reached the third set voltage V3, for example, due to the charge control function failing to function normally, the charge disable signal is output, causing the charge controller 3 to forcedly block the switch element 2 in response to the charge disable signal to prevent the secondary battery 1 from being applied with an excessive charge voltage.

The second comparator 3b operates in response to an open signal supplied from the charge controller 3 at a particular time within the switch element blocking period, while the pulse charging is under progress, to compare the terminal voltage Vb of the secondary battery 1 observed when the open signal is supplied, with the second set voltage V2. As previously described, in this embodiment, the open signal is supplied from the charge controller 3 to the second comparator 3b immediately before the switch element 2 is switched from the blocked state to the conductive state when a predetermined time has been elapsed from the time the switch element blocking period was entered during the pulse charging. Then, the second comparator 3b outputs a pulse charging stop signal, regarding that the secondary battery 1 is close to the fully charged state, when the terminal voltage Vb of the secondary battery 1, observed at the time the open signal is supplied, exceeds the second set voltage V2. The charge controller 3 stops the pulse charging in response to the pulse charging stop signal.

The fourth comparator 3d in turn compares the terminal voltage Vb of the secondary battery 1 with a fourth set voltage V0 which is previously set in accordance with the type of the secondary battery 1 and indicates that the terminal voltage becomes lower, and outputs a discharge signal indicative of a lower terminal voltage when the terminal voltage Vb is reduced to the fourth set voltage V0. The charge controller 3 forcedly conducts the switch element 2 in response to the discharge signal. As a result, the secondary battery 1 is charged if the electronic device A is connected to the commercial power supply.

Figure 3:
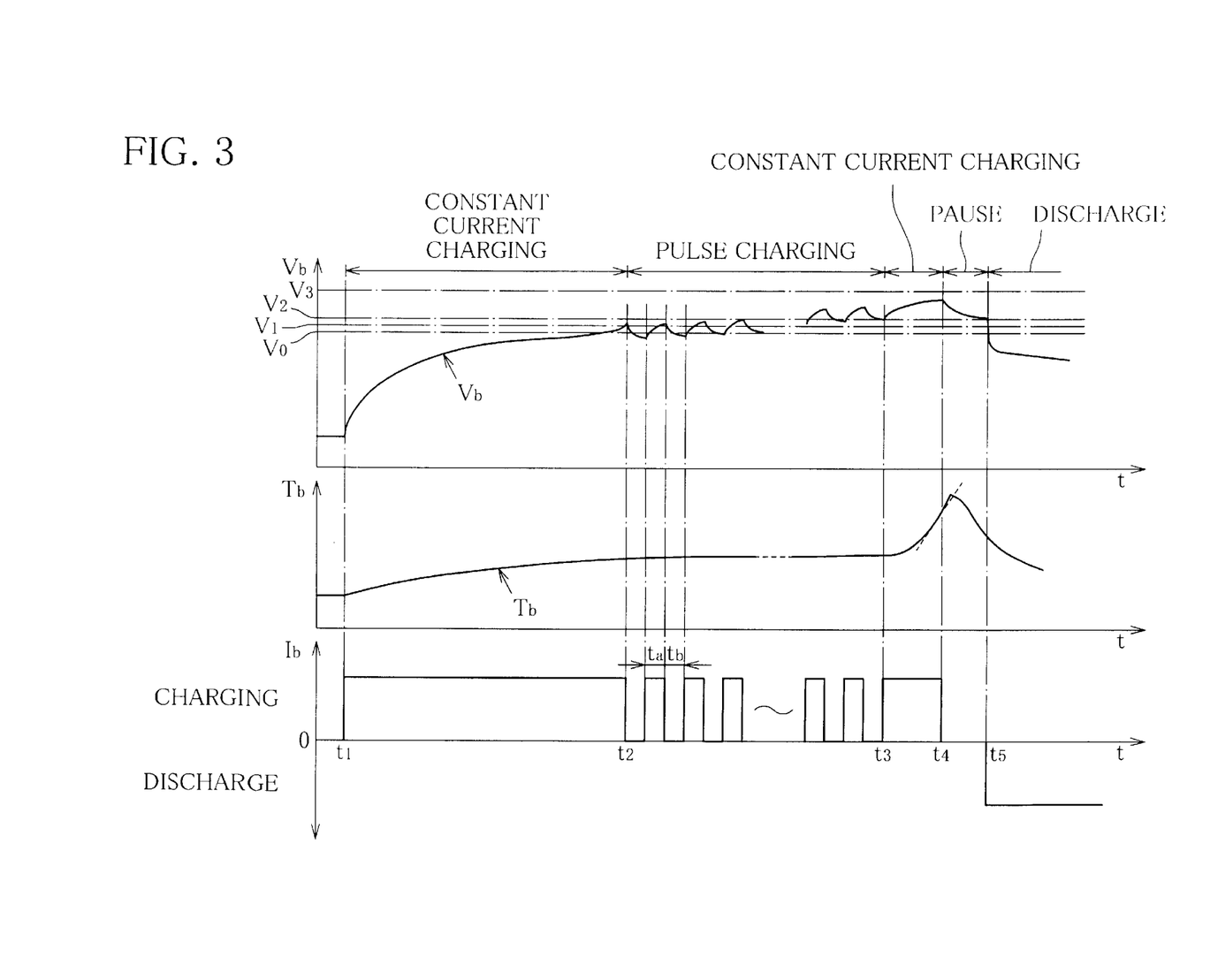
FIG. 3 is a graph showing a change in a battery terminal voltage and switching of charging modes, associated with a progress of charging of a secondary battery performed by the secondary battery apparatus illustrated in FIG. 1.

Referring to FIG. 3, the following description will be made on the charge control in the secondary battery apparatus according to this embodiment which comprises the foregoing charge control functions.

As shown in FIG. 3, after a charging start time t1 of the secondary battery 1, the charging is advanced to gradually increase a charge voltage (terminal voltage Vb), causing the battery temperature Tb to gradually rise as well. This charging is basically performed with a constant charge current Ib with the switch element 2 maintained in a conductive state. After the charging has been started, the first and third comparators 3a, 3b are supplied with a charge signal to operate both the comparators.

As the constant current charging of the secondary battery 1 is advanced to cause the terminal voltage Vb to reach the first set voltage V1 (at timing t2), a pulse charging start signal is output from the first comparator 3a to start the pulse charging. During the pulse charging, the switch element 2 is conducted and blocked at predetermined intervals to intermittently supply the charge current Ib. The ON/OFF period (ta/tb) of the switch element 2 is set to a preferred value within a range in which the secondary battery 1 is not heated and the charging efficiency is not degraded, for example, in consideration of the specifications of the secondary battery 1 and the magnitude of the charge current Ib. Thus, the secondary battery 1 is prevented from being heated during the pulse charging, so that the battery temperature Tb will hardly rise. Consequently, the secondary battery 1 is reliably charged by the pulse charging, with the terminal voltage Vb gradually increasing in accordance with the amount of charging.

During the pulse charging, when the terminal voltage Vb of the secondary battery 1, observed at a particular time within the switch element blocking period (immediately before a transition from the blocked state to the conductive state of the switch element 2), reaches the second set voltage (V2) close to the fully charged state (at timing t3), a pulse charging stop signal is output from the second comparator 3b. After this time, the switch element 2 is maintained in the conductive state, the pulse charging is stopped, and the constant current charging is resumed.

In this way, the secondary battery 1 close to the fully charged state is determined based on the result of detecting the terminal voltage Vb of the secondary battery 1 at the particular time within the switch element blocking period, so that even if the charge current Ib fluctuates for some reasons, the determination can be properly made without being affected by the fluctuations to provide a proper timing, at which the pulse charging should be stopped, based on this determination.

In the constant current charging subsequent to the pulse charging, the secondary battery 1 is supplied with a constant charge current Ib. Since the secondary battery 1 is already close to the fully charged state, the battery temperature Tb suddenly rises with the advance of the charging. The aforementioned temperature rising rate detector 6 monitors the rising rate of the battery temperature Tb to detect the secondary battery 1 having reached the fully charged state, for example, when the temperature rising rate indicates 1° C./minute, and outputs a full charge detection output to the charge controller 3 (timing t4). Then, the switch element 2 is blocked by the charge controller 3 in response to the full charge detection output to stop charging the secondary battery 1.

Thus, according to the charge control as described above, the secondary battery 1 is pulse charged from the time the secondary battery 1 has been charged to some degree to the time the secondary battery 1 is close to the fully charged state, so that the secondary battery 1 can be efficiently charged, while preventing the battery temperature Tb from rising, until the secondary battery 1 is close to the fully charged state. Subsequently, the secondary battery 1 is again charged with a constant current until the fully charged state is detected based on the rising rate of the battery temperature Tb, so that the secondary battery 1 can be reliably charged to the fully charged state.

Moreover, since the pulse charging is conducted to charge the secondary battery 1 while the heat generated therein is prevented, the battery temperature Tb will not suddenly rise due to the heat generated inside the secondary battery 1, and accordingly the charging can be safely and stably carried out without introducing danger such as thermal runaway. Further, since the pulse charging is stopped based on the terminal voltage Vb, observed when the switch element 2 is off, of the secondary battery 1, the pulse charging can be reliably stopped at a required time even if the charge current Ib largely fluctuates for some reasons, without being affected by the fluctuations of the charge current Ib, thereby eliminating the danger of malfunction.

While illustration is omitted in FIG. 3, the terminal voltage Vb of the secondary battery 1 exceeding the third set voltage V3 during the charging causes the charge controller 3 to block the switch element 2 in response to the charge disable signal output from the third comparator 3c, thereby prohibiting an excessive charge voltage from being applied to the secondary battery 1.

Also, FIG. 3 shows a change in the terminal voltage Vb of the secondary battery 1 observed in a case where the electronic device A is disconnected from the commercial power supply at the time t4 at which the charging is completed and the electronic device A is then operated using the secondary battery 1 as a driving power supply. In this case, the terminal voltage Vb becomes lower as the secondary battery 1 is used, and the secondary battery 1 is in a discharge state after time t5. It should be noted that for convenience of illustration, a time interval between the times t4 and t5 is shown rather shorter than the actual length in FIG. 3.

As previously described, the secondary battery apparatus according to this embodiment conducts the switch element 2 through the charge controller 3 in response to the discharge signal output from the fourth comparator 3d when terminal voltage Vb is below the fourth set voltage V0, so that if the electronic device A remains connected to the commercial power supply, the charging of the secondary battery 1 is resumed with the power supply unit of the electronic device A serving as a charge power supply when the terminal voltage Vb is below the fourth set voltage V0 as the electronic device A is used. Also, if the terminal voltage Vb becomes lower than the fourth set voltage V0 for some reasons after the secondary battery 1 has been once charged completely, the charging of the secondary battery 1 is resumed if the electronic device A remains connected to the commercial power supply.

The first embodiment may be altered in various manners.

For example, the first embodiment employs the dT/dt method based on the rising rate of the battery temperature for detecting the fully charged state of the secondary battery. Alternatively, the fully charged state may be detected based on the battery voltage Vb or by the aforementioned TCO method or $\Delta T$ method. Further alternatively, these fully charged state detecting methods may be combined as appropriate.

Also, while the first embodiment configures the charge control circuit 2 in hardware as illustrated in FIG. 2, the functions provided by the hardware configuration may be implemented in software using a microcomputer or the like.

Further, while in the first embodiment, the first through fourth set voltages V1, V2, V3, V0 associated with the generation of the pulse charging start signal, pulse charging stop signal, charge disable signal and discharge signal are set to fixed values, these set voltages may be variable in accordance with the battery temperature or the charge current Ib.

Further, while the first embodiment employs the fourth comparator 3d for detecting a discharge state based on the terminal voltage Vb of the secondary battery, the discharge state may be detected based on a current passing through the charge/discharge path.

Further, the fourth set voltage V0 indicative of a reduction in terminal voltage may be set to a small value close to the lower limit voltage of a normal battery, and the secondary battery may be charged with a minute current when the terminal voltage is equal to or below the set voltage V0.

Figure 4:
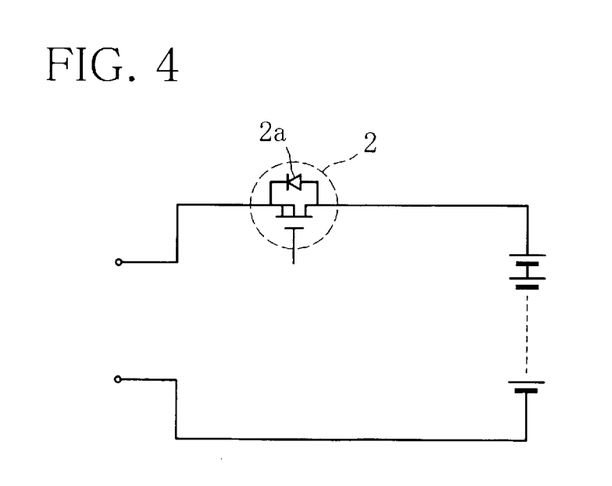
FIG. 4 is a circuit diagram illustrating a specific example of a switch element illustrated in FIG. 1.

Furthermore, when the switch element 2 is comprised of a MOS type FET, the discharge state of the secondary battery may be detected to conduct the FET when the voltage across the FET has reached a predetermined value. Specifically, the MOS type FET is generally located in the charge/discharge path with the polarity as illustrated in FIG. 4, so that the FET is susceptible to a failure due to the heat generated by a discharge current flowing through a parasitic diode 2a of the FET when the secondary battery discharges. The failure, however, may be obviated by conducting the FET during the discharging.

In the following, a secondary battery apparatus according to a second embodiment of the present invention will be described with reference to FIG. 5.

The secondary battery apparatus according to the second embodiment is basically configured in a manner similar to the first embodiment, so that description on actions and configuration of parts common to the first embodiment is omitted.

Figure 5:
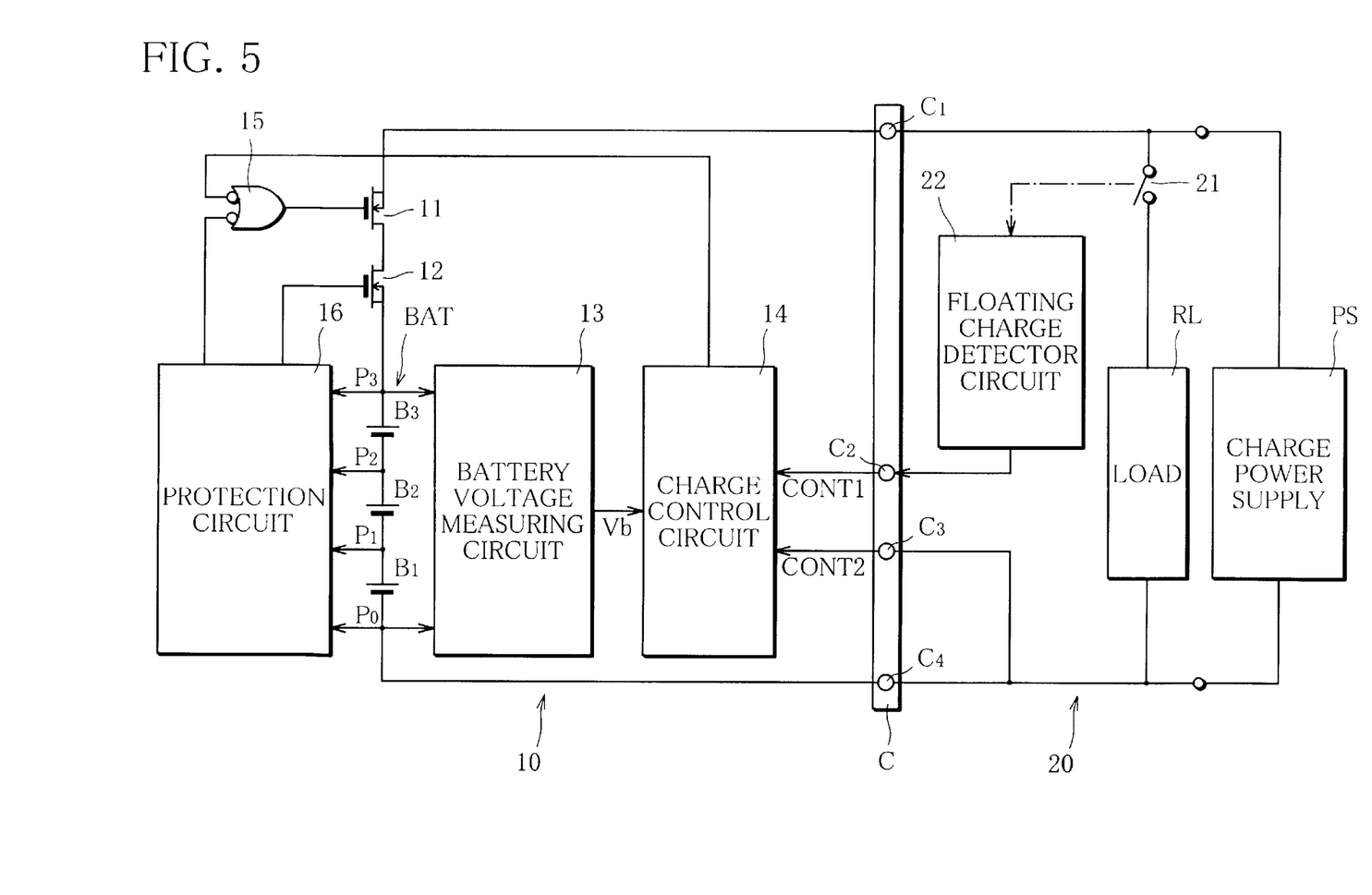
FIG. 5 is a schematic diagram illustrating a secondary battery apparatus according to a second embodiment of the present invention.

As illustrated in FIG. 5, the secondary battery apparatus comprises a battery pack 10 including as a main component a secondary battery BAT comprised of three serially connected battery cells B1, B2, B3 which may be lithium ion battery cells; and a power supply unit 20 including as a main component a charge power supply PS for use in charging the secondary battery BAT. The charge battery PS in this embodiment comprises a linear circuit of a so-called series control scheme which outputs a sufficiently high voltage capable of charging the secondary battery BAT, and a limited current. The charge power supply PS may comprise a so-called switching regulator which relies on switching control to output a constant voltage, or a so-called AC adapter which rectifies and smoothes an AC power supply in a simple configuration to output the rectified and smoothed power.

Then, the battery pack 10 and the power supply unit are connected to each other through a plurality of connection terminals c1, c2, c3, c4 in a connector C. More specifically, the positive pole (+) and negative pole (−) of the secondary battery BAT are connected to the positive pole (+) and negative pole (−) of the charge power supply PS through the connection terminals c1, c4 of the connector C, respectively, thereby forming a charge power supply line. The connection terminals c2, c3 of the connector C in turn are used as control signal input terminals in the battery pack 10.

A switch element 11 comprised of a p-channel FET, for example, is located in series in the power supply line on the positive pole (+) side in the battery pack 10. A switch element (FET) 12 for discharge control is also located in series with respect to the switch element 11, with its current control direction set opposite to that of the switch element 11. The switch element 12 operates under the control of the protection circuit 16 to prohibit the secondary battery BAT from discharging.

The battery pack 10 comprises a battery voltage measuring circuit 13 for detecting a terminal voltage Vb of the secondary battery BAT: and a charge control circuit 14 for controlling the switch element 11 to turn on/off in accordance with the battery voltage Vb detected by the battery voltage measuring circuit 13. The charge control circuit 14 is configured to apply its control output through a logical circuit (gate circuit) 15 to a gate electrode of an FET which constitutes the switch element 11. Specifically, only when the logical circuit is opening the logical gate in response to a charge enable output from the protection circuit 16, the control output of the charge control circuit 14 is applied to the switch element 11 to turn the switch element 11 on/off. On the other hand, when the logical gate of the logical circuit 15 is closed under the charge disable control of the protection circuit 16, the switch element 11 is forcedly turned off irrespective of the control output of the charge control circuit 14.

The protection circuit 16 detects battery voltages Vb1, Vb2, Vb3 of the battery cells B1, B2, B3 through nodes P1, P2, P3, P4, and outputs a charge disable signal (L signal) to the logical circuit 15 when any of the battery voltages Vb1, Vb2, Vb3 rises to a charge disable voltage $V_{OC}$. Also, the protection circuit 15 outputs a discharge disable signal (L signal) to the discharge switch element 12 when any of the battery voltage Vb1, Vb2, Vb3 lowers to a discharge disable voltage Vud.

In the power supply unit 20, a load RL is connected in parallel with the charge power supply PS. The load RL is powered from the charge power supply PS when the charge power supply PS is connected thereto, and powered from the secondary battery BAT through the connector C when the charge power supply PS is disconnected. Then, a switch 21 connected in series with the load RL functions as a power switch for turning on/off the power supply to the load RL.

The power supply unit 20 is provided with a floating charge detector circuit 22 that operates in an interlocking manner with the operation of the switch 21. The floating charge detector circuit 22 outputs a charge disable signal (H signal) when the switch 21 is conductive. The charge disable signal is supplied to the charge control circuit 14 through the connection terminal c2 of the connector C as a first external control signal CONT1. The connection terminal c3 of the connector C is connected to the negative pole (−) side of the power supply unit 20, and a signal applied to the connection terminal c3 is supplied to the charge control circuit 14 as a second control signal CONT2.

In the following, description will be made on the action of the secondary battery apparatus in the foregoing configuration.

For charging the secondary battery BAT, the secondary battery BAT is supplied with a micro-current I1 for initial charging to confirm whether or not the battery voltage Vb is increased by the initial charging. This battery testing is conducted under the control of the charge control circuit 14. Then, if the increased battery voltage Vb is not expected, the charging of the secondary battery BAT is aborted, regarding it as a defective battery. Alternatively, the charging of the secondary battery BAT may be started after the secondary battery BAT has been tested using a separately provided tester.

In the charging of the secondary battery BAT, constant current charging, pulse charging and constant current charging are sequentially performed in a manner similar to the first embodiment, and the charging is stopped when the battery voltage measuring circuit 13 detects a terminal voltage indicative of the fully charged state.

In this embodiment, as the operation of the load RL and thus power supply to the load RL from the charge power supply PS are started during the charging (particularly during the charging with a charge current at a predetermined value or more) to cause the floating charge detector circuit 22 to output the charge disable signal (H signal), the charge control operation of the charge control circuit 14 is disabled to thereby stop charging the secondary battery BAT. Therefore, the load RL is stably powered even if the charge power supply PS has a small power supply capacity, so that the load RL can be stably operated. Particularly, when the charge power supply PS is utilized both for pulse charging the secondary battery BAT and for driving the load RL, the charge power supply PS is likely to experience fluctuations in load associated with the pulse charging to adversely affect the operation of the load RL. In this embodiment, however, since the charging of the secondary battery BAT is stopped while the load RL is being powered, fluctuations in load of the charge power supply PS can be suppressed to stabilize the operation of the load RL. The charging of the secondary battery BAT, on the other hand, is stably carried out utilizing an inoperative or pause period of the load RL in which the load RL is not powered.

During the charging of the secondary battery BAT, the charge control circuit 14 monitors the battery voltages of the respective battery cells in cooperation with the protection circuit 16 to conduct the charge control, for example, to limit the charging of the battery cell which presents the highest battery voltage. As a result, even if the plurality of battery cells vary in charging characteristic, it is possible to prevent an inconvenience that only a particular battery cell reaches the fully charged state at an earlier time and is excessively charged.

The secondary battery apparatus according to the second embodiment may be altered in various manners. For example, while the foregoing embodiment has been described for the charging of a nonaqueous solvent based secondary battery, the present invention may be applied to charge a lead battery and alkaline-based secondary batteries such as a nickel hydrogen secondary battery, a nickel-cadmium battery, and so on.

The present invention is not limited to the foregoing first and second embodiments and modifications thereof, but may be altered and implemented in various manners without departing from the spirit and scope of the invention.

What is claimed is:

1. A secondary battery apparatus comprising:

a secondary battery;

a switch element provided in series in a charge circuit of said secondary battery;

a voltage detector for detecting a terminal voltage of said secondary battery;

a full charge detector for detecting said secondary battery having reached a fully charged state; and a charge controller for controlling charging of said secondary battery by conducting or blocking said switch element, said charge controller including:

a pulse charging starting unit for starting a conducting/blocking operation of said switch element at predetermined intervals to start pulse charging said secondary battery when the terminal voltage exceeds a first set voltage during the charging of said secondary battery;

a pulse charging stopping unit for stopping said pulse charging while maintaining said switch element in a conductive state when the terminal voltage has reached a second set voltage during a switch element blocking period of said pulse charging; and a charge stopping unit for blocking said switch element to stop charging subsequent to said pulse charging when said full charge detector detects the fully charged state of said secondary battery during the charging subsequent to said pulse charging.

2. The secondary battery apparatus according to claim 1, wherein said charge controller blocks said switch element when the terminal voltage of said secondary battery has reached an abnormally high third set voltage during the charging of said secondary battery.

3. The secondary battery apparatus according to claim 1, wherein said full charge detector comprises a temperature sensor for detecting a temperature of said secondary battery, and detects said secondary battery having reached the fully charged state when the battery temperature detected by said temperature sensor has reached a set temperature, or when an increase in said battery temperature exceeds a set value, or when a rising rate per time of said battery temperature exceeds a set value.

4. The secondary battery apparatus according to claim 1, wherein said full charge detector detects that said secondary battery has reached the fully charged state when the terminal voltage of said secondary battery detected by said voltage detector has reached a set voltage, or when a peak of a voltage change is detected, or when a predetermined voltage drop is detected after the peak of the voltage change has been detected.

5. The secondary battery apparatus according to any of claims 1 through 4, wherein said charge controller conducts said switch element when the terminal voltage of said secondary battery is equal to or below a predetermined voltage, or when a discharge state of said secondary battery is detected.

* * * * *